Patented Apr. 30, 1940

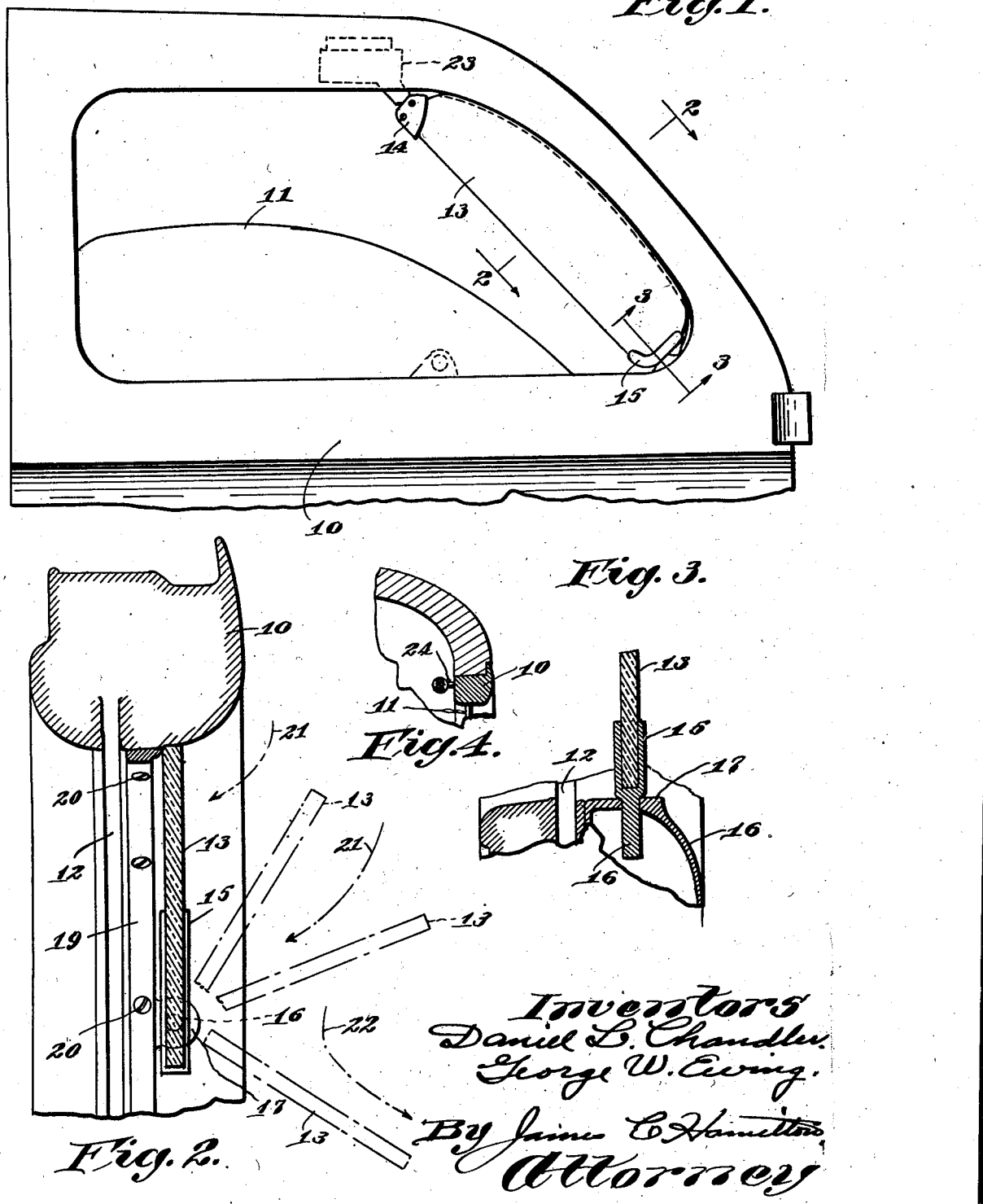

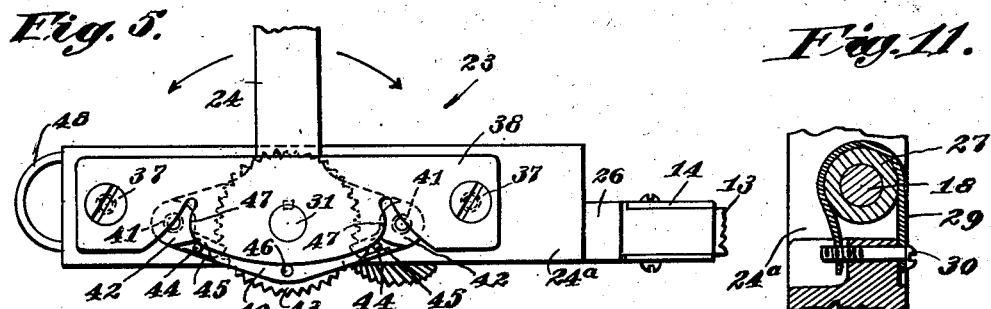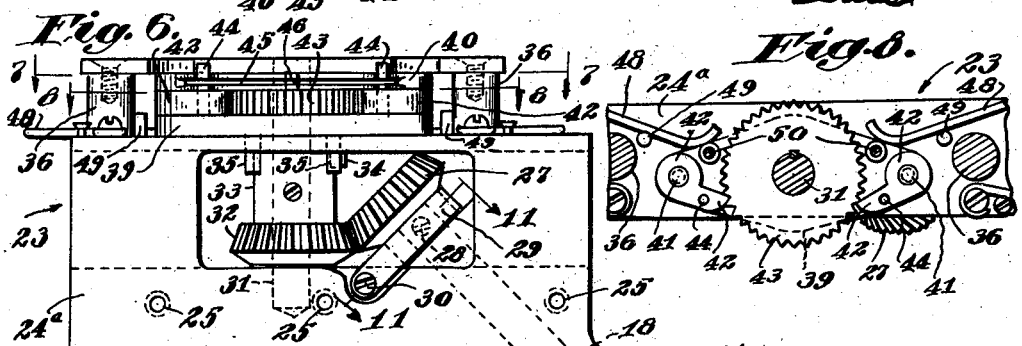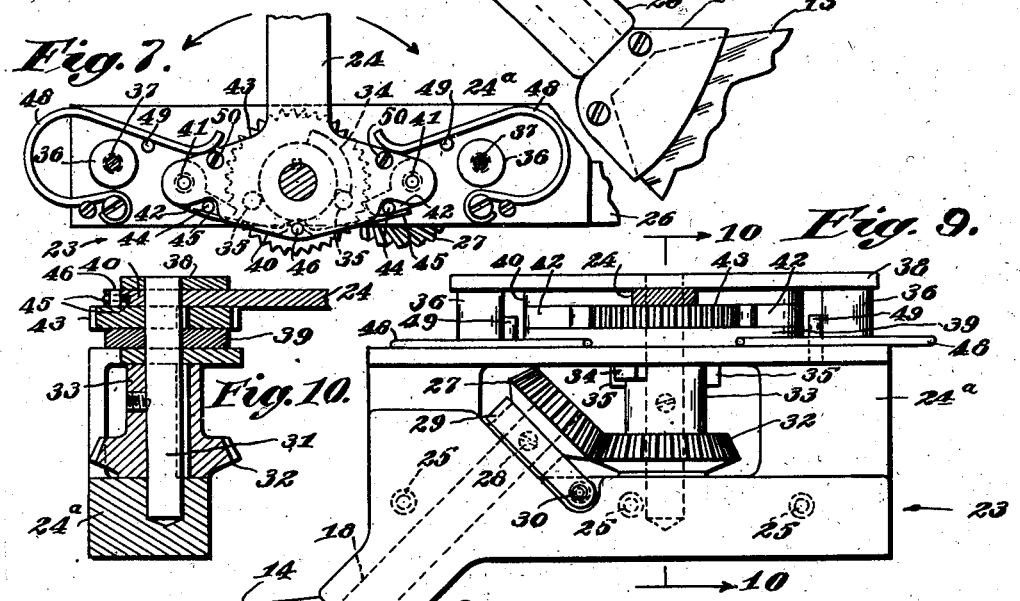

2,198,911

UNITED STATES PATENT OFFICE 2,198,911

AUTOMOBILE WINDOW VENTILATOR CONTROL

George W. Ewing, Peabody, and Daniel L. Chandler, Salem, Mass., assignors to Aresco Company Inc., Salem, Mass., a corporation of Massachusetts Application January 23, 1939, Serial No. 252,426

5 Claims. (Cl. 296—84)

Our improved ventilator comprising our disclosure hereinafter set forth relates to ventilators, and more particularly to automobile door ventilators.

In our present ventilator, we have disclosed a new method of operation together with new apparatus for accomplishing the desired results.

In modern automobile ventilation, it has long been desired to withdraw the air from the interior of the automobile to the outside with a minimum of energy and apparatus.

In our present invention we have accomplished all of these desirable effects and the result is an improved device for ventilating automobiles;

Our principal object is an improved ventilator for automobiles and the like;

Another object is an improved ventilator for automobiles comprising a window member which may be rotated from right to left so that the air may be directed to the interior of the vehicle or withdrawn from same by simply turning the ventilator to the right or the left;

Another object of our invention is an improved apparatus for rotating the ventilator to right and left to obtain the above desired results, and Other objects and novel features comprising the construction and operation of our invention will appear as the description of the same progresses.

In the drawings illustrating the preferred embodiment of our invention, Fig. 1 illustrates the upper portion of an automobile door with our apparatus attached.

Fig. 2 is a fragmentary cross-section taken on the line 2—2 of Fig. 1 showing the ventilator in a closed position;

Fig. 3 is a fragmentary cross-section taken on the line 3—3 of Fig. 1 showing the lower pivot end of the ventilator in the automobile door;

Fig. 4 is a typical fragmentary cross-section taken through the upper portion of an automobile door in a closed position with the automobile top portion, the section being taken to the rear of the ventilator mechanism and particularly showing the position of the ventilator control lever with respect to the top of the door frame and the automobile top;

Fig. 5 is a plan view of the control mechanism removed from the door;

Fig. 6 is a side elevation of the control mechanism, as viewed from the outside portion of the door;

Fig. 7 is a plan cross-section taken on the line 7—7 of Fig. 6;

Fig. 8 is another plan cross-section taken on the line 8—8 of Fig. 6, the end portions being broken away for convenience;

Fig. 9 is the opposite side elevation from that shown in Fig. 6, the ventilator blade being broken away for convenience;

Fig. 10 is a detail vertical cross-section taken on the line 10—10 of Fig. 9, and Fig. 11 is a fragmentary cross-section taken on the line 11—11 of Fig. 6.

Referring more in detail to the drawings, and especially Figs. 1 to 4 inclusive, 10 indicates an automobile door. The lower portion of the door 10 has been broken away for convenience as it is not concerned with the present invention. 11 is the glass window pane of the door in a partially raised position and which operates in the door frame slot 12 in the conventional manner.

In the front curved portion of the door and window frame is located the ventilator blade 13 which is preferably composed of plate glass and is supported at each end by the brackets 14 and 15. The lower bracket 15 may be formed in one piece with the pivot shaft 16 which is pivoted in the boss 17 formed on the window ledge of the door, better shown in Fig. 4.

The upper end of the blade 13 is clamped in the bracket 14, the upper end of which comprises a pivot stem 18, better shown in Figs. 6 and 9.

In Fig. 2 we have shown an enlarged scale drawing of the ventilator blade 13 in combination with a portion of the window frame portion of the door 10. When the blade 13 is closed as shown in Fig. 2, the inner front edge bears against a stop strip 19 which is secured to the window opening by the screws 20, or by any other convenient means. The dot-and-dash lines indicate various intermediate positions to which the blade may be turned to for the purpose of ventilation. In the position indicated by the arrows 21, the air is directed into the vehicle when in motion. When the blade is turned to the position indicated by the arrow 22 the air stream is deflected away from the window thereby setting up an area of low pressure at this point and withdrawing air from the interior of the vehicle.

The control mechanism is generally indicated at 23 in Fig. 1 and shown in detail in Figs. 5 to 11 inclusive. The actuating lever 24, shown in Fig. 4, projects slightly into the interior of the vehicle and is pivoted in the control mechanism 23. The motion of the lever 24 is horizontal either to the front or to the rear, as the case may be, and always returns to a neutral center position when released.

Referring more in detail to the control mechanism 23, as shown in Figs. 5 to 11 inclusive, a casting member 24a upon which the apparatus is mounted is attached to suitable anchor members located within the casing of the door frame by means of screws which are adapted to fit in the threaded holes 25. The lower forward corner of the casting 24a comprises a boss 26. The central pivot bearing of the boss 26 is located at an angle of approximately forty-five degrees to the horizontal axis of the casting 24a and is adapted to receive the stem 18 of the upper blade bracket 14. The upper end of the stem 18 is provided with a bevel gear 27 which is secured to it by a set screw 28. Around the hub portion of the gear 27 we have placed a band 29 the ends of which are anchored to the casting 24a by means of a screw 30 the threaded end of which is threaded through one end of the band 29 so that the band may be tightened up or slacked off, as the case may be, thereby providing a friction member for the gear 27 which prevents the blade 13 from rattling or vibrating due to backlash in the control mechanism.

In approximately the central portion of the casting 24a we have placed a vertical shaft 31 which is pivoted in the lower portion of the casting and on which is either keyed, set-screwed or both, another bevel gear 32. The gear 32 is provided with a long boss 33 extending upwardly to the under side of the top portion of the casting 24a and is further provided adjacent its top with a stop shoulder 34. Pins 35 are mounted in the casting 24a and adapted to limit the rotation of the gear 32, as shown in Fig. 7.

On the upper face of the casting 24a are provided at each end bosses 36 to which is fixed by the screws 37, a top plate 38. Between the top plate 38 and the top of the casting 24a is located a ratchet mechanism comprising a lower member 39 and an upper member 40 both of which are rotatably mounted on the upper portion of the gear shaft 31, the upper member 40 being either integral with or otherwise securely fixed to the lever 24 which actuates the control mechanism from the interior of the vehicle. The upper member 40 and lower member 39 are pinned together at their ends by the shouldered pins 41 around which are positioned pawl members 42. Surrounding the shaft 31 and keyed thereto is a ratchet wheel 43 which is adapted to engage with the pawls 42. The pawls 42 are provided with pins 44 against which the common spring 45 bears for the purpose of keeping the pawls in engagement with the teeth of the ratchet wheel 43. The spring 45 is held in a groove in the face of the top member being held in place by the pin 46.

The top plate 38 is provided with cam faces 47 which are adapted to engage the pawl pins 44 so that when the lever 24 is thrown to the right the right-hand pawl engages the teeth of the ratchet wheel 43 and the left-hand pawl moves out of contact with the teeth on the other side of the ratchet wheel. Due to the fact that the ratchet wheel 43 is keyed to the shaft 31, the gears 32 and 27 are operated and the ventilator blade 13 is pivoted around until the stop member 35 on the gear boss 33 engages one of the pins 35. A reverse movement of the lever 24 reverses the movement of the blade 13.

Springs 48 are anchored on the upper side of the casting 24a and bear against the sides of the member 38 being held in a normal position by the pins 49. When the lever is released from either a forward or rearward movement, the springs 48 automatically return the lever 24 and whole unit which is pivoted around the upper end of the shaft 31 to the central neutral position, as shown in the drawings but the ratchet wheel and gears remain in the position attained at the end of the forward or rearward movement of the lever 24.

The shouldered pins 50 are provided in the members 38 and 40 to clamp these units together tightly so that they move as a unit but cannot twist thereby allowing free movement of the pawls 42 and the ratchet wheel 43.

Having thus described our invention, what we claim as new is:

1. In a window structure, a window casing, a pivoted ventilator wing located in said casing, mechanism mounted in said casing comprising a drive shaft connecting the upper end of said wing and a bevel gear, a second bevel gear meshed with said first gear, a swivel unit rotatably mounted around said drive shaft, a ratchet wheel located in said swivel unit and keyed to said shaft, pawls pivoted in said swivel unit and adapted to engage with said ratchet wheel, cams located on said swivel unit adapted to engage with said pawls, self centering springs attached to said swivel unit and engaging said swivel member and being adapted to return said swivel unit to a normal operating position after said swivel unit has been operated to the right or left, an operating lever connected to said swivel member and projecting horizontally within the inside of said window and adapted to operate in a horizontal plane.

2. In a ventilator for automobile doors having a blade pivoted in the frame of said door adjacent the window opening, a pivoted ratchet unit adapted to drive said blade, the said ratchet unit having an operating lever extending from the inside of the top of said door frame and adapted to move in a horizontal plane, means for self centering said lever comprising compression springs located on either side of said lever within said door frame, a friction member attached to the drive end of said blade adapted to prevent said blade from movement when not acted upon by said lever.

3. In a control mechanism for pivoted ventilator blades in door windows, a reversely operating ratchet drive member connected to said blade, means for rotating said blade into an open or closed relation with said window comprising a horizontally pivoted lever and ratchet drive unit, said lever extending inside of said door, and means for automatically centering said ratchet member at the end of each stroke.

4. In an improved obliquely mounted ventilator blade mechanism mounted in the window frame of an automobile door, horizontally pivoted ratchet lever operating means connecting said blade, said lever means being located at the top inside of the frame and having self centering means fixed in the frame of said door and adapted to return said lever to a normal operating position when in a free position.

5. In a control apparatus for rotating a pivoted ventilator in the window opening of an automobile door comprising a pivoted ratchet member extending within said automobile from the top side of the frame of said door, said ratchet member adapted to swing in a horizontal plane and having a self returning normal position point operated from balanced springs engaging each side of said ratchet member with respect to pivoted center of said ratchet member, said ratchet member being attached to a ventilator blade mounted in said window opening.

DANIEL L. CHANDLER.
GEORGE W. EWING.